Figure 1:
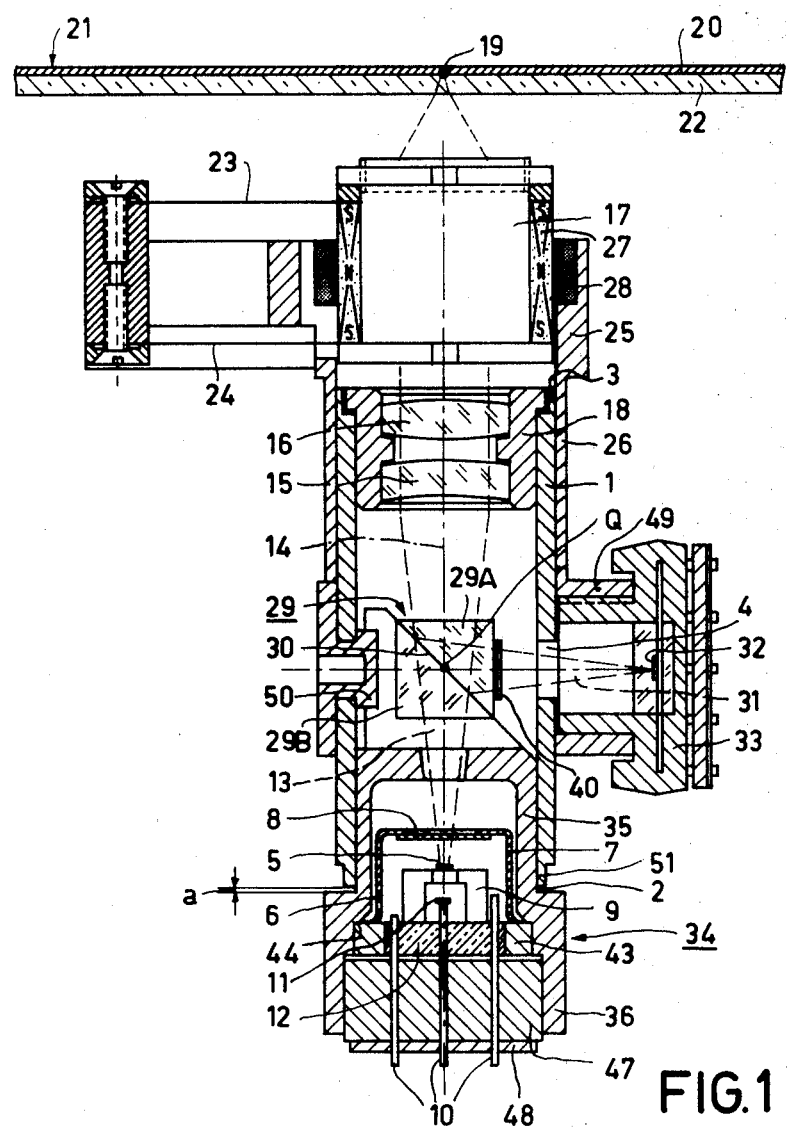

United States Patent [19]
van de Veerdonk et al.

[11] 4,453,241
[45] Jun. 5, 1984

[54] OPTICAL SCANNING UNIT FOR READING INFORMATION FROM AN OPTICAL RECORDING

[75] Inventors: Johannes T. A. van de Veerdonk; Antonius A. M. van Alem, both of Eindhoven, Netherlands

[73] Assignee: U.S. Philips Corporation, New York, N.Y.

[21] Appl. No.: 328,875

[22] Filed: Dec. 9, 1981

[30] Foreign Application Priority Data

Oct. 8, 1981 [NL] Netherlands .......................... 8104589

[51] Int. Cl.$^3$ ............................ G11B 7/00; G02B 7/18
[52] U.S. Cl. ..................................... 369/112; 369/122; 350/287
[58] Field of Search ..................................... 369/44–46, 369/112, 122; 350/255, 286, 287, 446, 486, 173

[56] References Cited

U.S. PATENT DOCUMENTS

| | | | |
|---|---|---|---|
| 4,067,044 | 1/1978 | Maeda et al. | 369/44 X |
| 4,334,300 | 6/1982 | Arquie et al. | 369/112 X |
| 4,337,531 | 6/1982 | Willemsen | 369/45 |

FOREIGN PATENT DOCUMENTS

2505074 11/1982 France ................................. 369/45

Primary Examiner—Aristotelis M. Psitos
Attorney, Agent, or Firm—Thomas A. Briody; Robert T. Mayer; Algy Tamoshunas

[57] ABSTRACT

An optical scanning unit for scanning recording tracks of a record carrier with a radiation beam. The beam is emitted by a radiation source arranged at one end of a tubular member and is concentrated to a radiation spot by a lens system arranged at the other end of the tubular member. A double prism disposed between the source and lens system splits-off a reflected secondary radiation beam and directs it laterally towards an electronic output device through a lateral aperture in the tubular member. The output device converts the modulated reflected radiation into an electrical signal. The radiation source and the double prism are radially and axially aligned within the required tolerances on a metal prism support which, within an adjustment range, can be moved axially relative to the tubular member and which can be rotated to a limited extent. The support is fixed relative to the tubular member after the reflected beam has been made to impinge on the radiation-sensitive means in the correct manner by said movement and rotation.

11 Claims, 5 Drawing Figures

OPTICAL SCANNING UNIT FOR READING INFORMATION FROM AN OPTICAL RECORDING

The invention relates to an optical scanning unit for scanning recording tracks of a reflecting optical record carrier, which unit comprises: a tubular part having a first end and a second end and formed with a lateral opening; a radiation source arranged near the first end of the tubular part for emitting an unmodulated primary radiation beam towards the second end along a beam axis; a lens system having an optical axis and arranged near the second end of the tubular part for concentrating the radiation beam so as to form a radiation spot; a double prism comprising first and second prisms attached to each other, which double prism has a splitting surface disposed at an angle of 45° to the beam axis for deflecting a secondary radiation beam, reflected by the record carrier and modulated by the recording tracks, in a lateral direction through the lateral opening in the tubular part; and an electronic output device arranged externally of the tubular part and provided with radiation-sensitive means, which device is disposed in the path of the secondary radiation beam, for converting the radiation-beam modulation into an electrical modulation.

Such a scanning unit, intended for a so-called optical audio disk player, is described in the article "PCM-Schallplatte für die achtziger Jahre", Radio Mentor, Jahrgang 45, (1979), No. 4, pages 138 and 139. The radiation source comprises a semiconductor laser arranged on the optical axis of the lens system, so that the beam axis of the primary, unmodulated radiation beam coincides with the optical axis of the lens system. The reflected light beam, which has been modulated by the information contained in the information tracks of the optical audio disk, is partly reflected to the electronic output device by the splitting surface of the double prism via the lateral opening in the tubular part of the housing, which output device converts the radiation beam modulation into an electrical modulation which is applied to suitable electronic circuitry.

The location and orientation of the double prism in the optical scanning unit is essential. The unmodulated primary radiation beam should be concentrated correctly to form an optimally round read spot with an optimally uniform radiation-intensity distribution on the recording surface on the audio disk. For the incident primary beam the behaviour of the double prism should therefore as closely as possible approximate that of a purely plane-parallel optical body, that is one which causes minimal distortion of the primary radiation beam. A correct imaging of the recording tracks on the electronic output device is possible when the optical pathlength for the primary radiation beam is accurately equal to the optical pathlength for the secondary, reflected radiation beam. This means that the double prism and the electronic output device should be positioned accurately relative to each other and that the distance covered by the primary radiation beam from the instant that it enters the double prism until it reaches said splitting surface should be exactly equal to the distance traversed by the reflected, secondary radiation beam from the instant that it is incident on the splitting surface until it reaches the location where it emerges from the double prism. Moreover, the distance from the semiconductor diode laser to the splitting surface of the double prism should be equal, within narrow tolerances, to the distance from the radiation-sensitive means of the electronic output device to the splitting surface. In view of the use of the known optical scanning unit, namely its use in an optical audio disk player suitable for mass-manufacture and for large-scale domestic use, it is necessary that the optical scanning unit can be manufactured at a low cost price. Moreover, it should permit fast and efficient maintenance and replacement routines.

It is an object of the invention to provide an optical scanning unit of the type mentioned in the opening paragraph, which is of a simple construction, which has fewer parts and which can be manufactured with the required precision at comparatively low cost, so that the scanning unit is eminently suitable for use in consumer equipment. The invention is characterized in that: a prism support arrangement is mounted in the first end of the tubular part, which arrangement comprises a metal support on which said double prism and the radiation source are mounted so as to be in radial and axial alignment relative to each other within the required tolerances; the prism support arrangement, within an adjustment range, is axially movable relative to the tubular part with minimal play and is also rotatable, at least to a limited extent; and the prism support arrangement is fixed relative to the tubular part within said adjustment range in a position in which the reflected secondary radiation beam impinges on the radiation-sensitive means of the output device within a specified tolerance zone via the lateral opening in the tubular part.

The metal support of the prism support arrangement of the optical scanning unit in accordance with the invention has several functions. Firstly, the support functions as a so-called "heat-sink" for the diode laser, that is, it forms a part having a high thermal conductivity which is capable of carrying off heat developed by the semiconductor laser rapidly and with a small temperature gradient. Secondly, the support functions as a stable and robust mount to which the splitter prism can firmly be secured. The support can be manufactured with the required accuracy using the customary machining operations, alignment and mounting of the splitter prism on the support being effected with a suitable alignment tool which aligns and positions the splitter prism with the required accuracy relative to the support. Thirdly, the support forms a component which during assembly of the optical scanning unit can be manipulated in order to adjust the prism support arrangement relative to the tubular part of the housing in such a way that the reflected portion of the secondary radiation beam is accurately incident on the radiation-sensitive means of the electronic output device at the desired location. For this purpose the output device is initially mounted on the exterior of the tubular part and the prism arrangement is axially shifted and rotated relative to the tubular part of the housing until the correct position of the prism arrangement is indicated by measuring equipment. In this position, the support is subsequently fixed relative to the tubular housing. In essence, the problems of correctly aligning and positioning the optical radiation-sensitive parts of the optical scanning unit in accordance with the invention are thus reduced to the accurate manufacture of a metal support, mounting of the double prism in the correct position and orientation by means of suitable alignment tools, mounting of the prism arrangement and empirically determining the correct position of the prism arrangement relative to the output device, and finally the fixation of the prism arrangement relative to the tubular part of the housing in the correct position thus found.

An embodiment of the invention which is favourable with respect to the mounting of the double prism on the support of the prism arrangement is characterized in that: at a free end facing the radiation source the support of the prism arrangement is bevelled at an angle of 45° relative to the beam axis of the radiation source; the bevelled portion is formed with a slot parallel to a plane which is defined by the beam axis and a normal to the bevelled portion which intersects the beam axis, so that on each side of the slot a bevelled surface is formed; the first prism of the double prism extends across the slot and is attached to the two bevelled surfaces; and the second prism engages in the slot and is attached to the first prism. This embodiment has some substantial advantages. Forming a surface on the support which with great accuracy encloses an angle of 45° with the axis of the support is possible in a comparatively simple manner within the required tolerances by machining operations. This surface is used as a reference surface when mounting the double prism. Each of the prisms can then be adjusted to the desired position independently of the other prism using an alignment tool. Only the first prism is attached to the support. The second prism is attached to the first prism, but not to the support. This fixing method has the additional advantage that the reflecting surface of the double prism is not subject to stresses occurring during operation, mainly thermal stresses which may occur as a result of the support being heated by the semiconductor diode laser.

In a further embodiment of the invention the support has an additional function. This embodiment is characterized in that the tubular part is internally provided with a locating cam which engages said slot of the prism arrangement with clearance in order to obtain a coarse adjustment relative to the tubular part in the direction of rotation of the prism arrangement. The advantage of this embodiment mainly resides in the fact that before the support is adjusted relative to the housing it can be fitted in a substantially correct position, which may provide a substantial gain of time during the previously described adjustment of the prism arrangement relative to the housing.

For securing the two prisms to the support it is advantageous to use an embodiment which is characterized in that the first prism is attached both to the two bevelled surfaces of the support and to the second prism by means of a layer of a transparent cement which is applied over the entire width of the first prism. Only one of the two prisms needs to be provided with a layer of cement, which may greatly reduce problems presented by the use of a cement in mass manufacture. Suitably types of cement for use in accordance with the invention are for example the known ultra-violet-curing cements, which are commercially available for bonding optical components to each other. These types of cement are clear and cure very rapidly when exposed to ultraviolet light.

In the optical scanning unit described in the aforementioned article the reflected secondary radiation beam is split into two sub-beams by a beam-splitting optical element, which sub-beams each co-operate with two radiation-sensitive diodes of the output device. The beam-splitting element is arranged on that side face of the double prism where the reflected secondary radiation beam leaves the double prism. An embodiment of the invention in which a beam-splitting optical element is arranged at the said location is characterized in that said optical element entirely consists of a cured transparent cement. This embodiment of the invention has some substantial advantages. In comparison with said known optical scanning unit, in which the beam-splitting element is integral with the first prism of the double prism, a first prism of simpler shape may be used. A separately manufactured beam-splitting optical element would have very small dimensions and would be highly vulnerable. Manufacture, handling and aligning with the required accuracy relative to the first prism would present great problems. All these problems are obviated by the use of the invention. The optical element is formed by applying a drop of cement on the side face of the prism arrangement, subsequently pressing a die of suitable shape into the drop of cement in the correct position relative to the prism arrangement and finally allowing the cement to cure. Then, it is again advantageous to utilize a cement which cures under the influence of ultraviolet light. Apart from the previously mentioned advantages, this embodiment has another major advantage: owing to the accurate alignment and positioning of the die, which can be achieved by means of an adjustment tool, the correct orientation and correct position of the refractive edge of the beam-splitting optical element relative to the central axis of the prism support and thus the optical axis are always accurately defined, regardless of the orientation of the side face of the first prism on which the beam-splitting element is formed. This is because the space between said side face and the die is entirely filled with a transparent cement.

Figure 2:
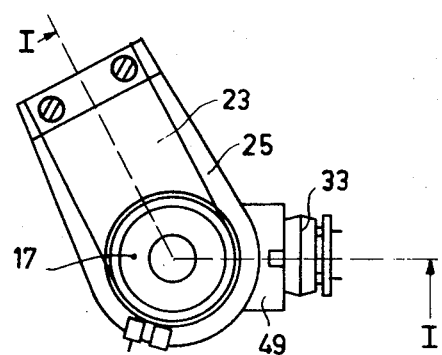
Figure 3:
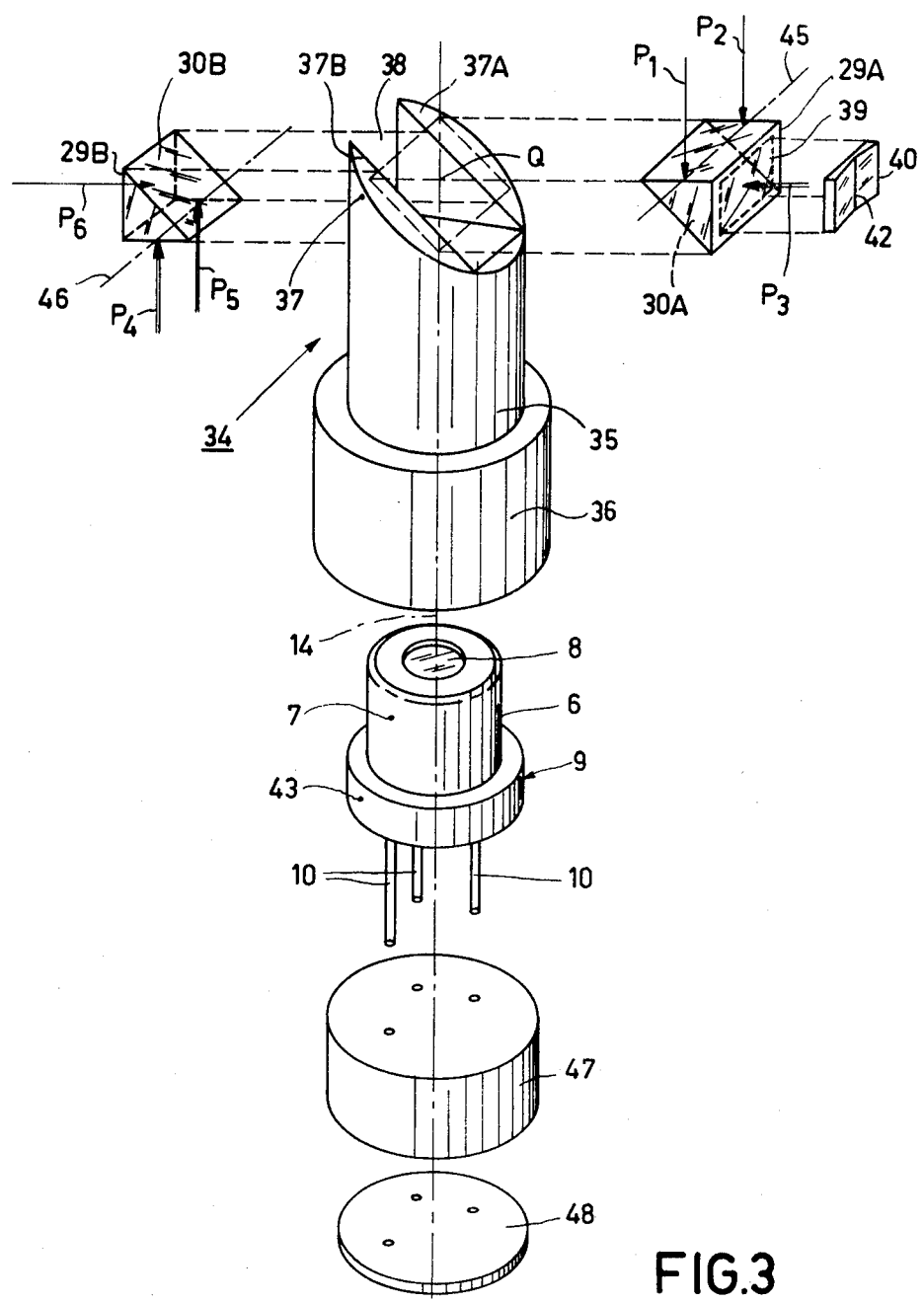
Figure 4:
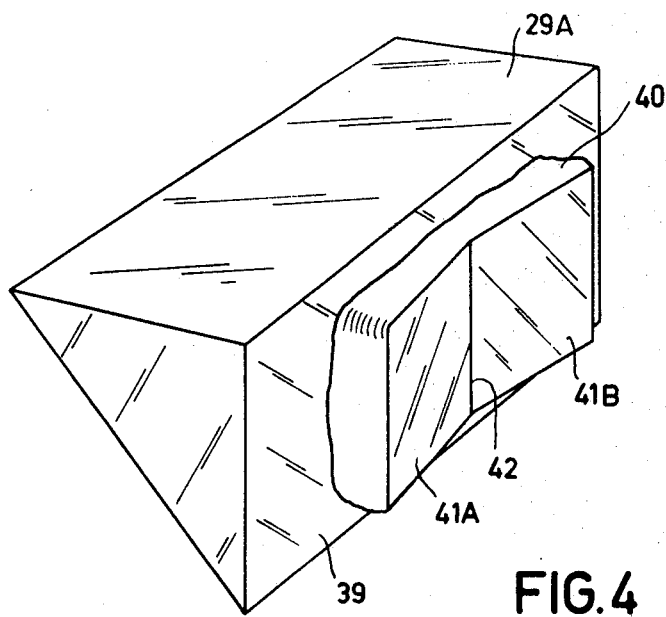
Figure 5:
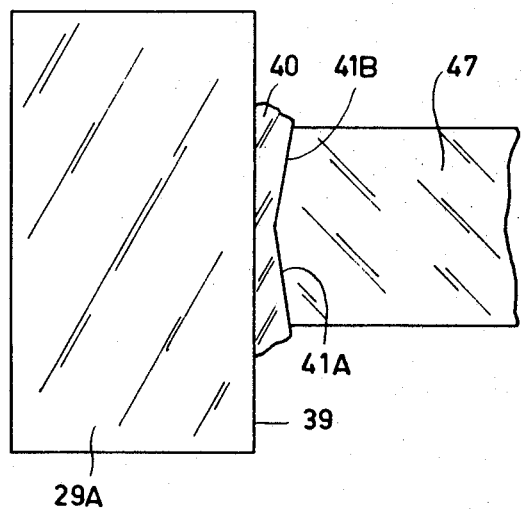

An embodiment of an optical scanning unit in accordance with the invention will now be described in more detail, by way of example, with reference to the drawing, in which:

FIG. 1 is a longitudinal section, amply three times actual size, of a scanning unit and a part of an optical disk, FIG. 2 is a plan view, approximately twice actual size, of the optical scanning unit of FIG. 1, FIG. 3 is an exploded view of the prism arrangement and some other parts of the optical scanning unit at substantially the same scale as FIG. 1, FIG. 4 is a perspective view, a greatly enlarged scale, of the first prism provided with a beam-splitting optical element, and FIG. 5 is a plan view of the prism of FIG. 4 during manufacture of the beam-splitting optical element.

The optical scanning unit shown comprises a tubular part 1 having a first end 2 and a second end 3 and it is formed with a lateral opening 4. A radiation source 5 in the form of a commercially available semiconductor laser device 6 is arranged near the first end 2. Said device comprises a metal enclosure 7, a glass window 8, a brass support 9, a plurality of connecting pins 10, a light-sensitive diode 11 for intensity control, and feedthrough insulator 12. The laser 5 projects an unmodulated primary radiation beam 13 along a beam axis 14, which coincides with the axis of the tubular part 1. Near the second end 3 of the tubular part there is arranged a lens system which comprises two lenses 15 and 16 and a plurality of lenses, not shown, of an objective 17. The lenses 15 and 16 are mounted in a lens mount 18, which is pressed into the tubular part 1. Together they convert the divergent radiation beam from the laser 5 into a parallel beam. The objective 17 concentrates the radiation beam to form a radiation spot 19 on the recording surface 20 of an optical disk 21. The recording layer 20 is covered with a transparent coating 22 through which the radiation beam 13 is focussed. In order to enable possible deviations in the position of the recording layer 20 to be followed with the radiation spot 19, the objective 17 is movable to a limited extent in the direction of the optical axis which coincides with the beam axis 14. For this purpose the objective 17 is movably suspended in an objective unit 25 by means of two parallel leaf springs 23 and 24, the objective unit being slidable on the tubular part 1 by means of a cylindrical sleeve 26. A tubular permanent-magnetic body 27 is arranged around the objective 17, which body is axially magnetized and comprises areas of a magnetic polarity as indicated in the drawing. Around said magnetic body an annular coil 28 is arranged, to which a control current can be applied for controlling the focussing position of the objective.

Between the laser 5 and the lens system a double prism 29 is arranged. Said prism comprises a first prism 29A and a second prism 29B, which are attached to each other with a splitting surface 30 at an angle of 45° to the beam axis 14. Said splitting surface serves for deflecting a secondary radiation beam 31, reflected by the optical disk 21 and modulated by the recording tracks in the recording surface 19, through the lateral opening 4 in the tubular part 1. The secondary radiation beam is concentrated on the radiation-sensitive means 32 belonging to an electronic output device 33 arranged externally of the tubular part. The radiation-sensitive means 32 convert the radiation-beam modulation into an electrical modulation.

A prism arrangement 34 is mounted in the first end 2 of the tubular part. Said arrangement comprises an aluminium support 35 on which both the double prism 29 and the laser device 6 are arranged, radially and axially aligned relative to each other within the required tolerances. The support 35 comprises a portion 36 of slightly greater diameter which offset from the tubular part 1, in which portion the laser device 6 is mounted. Between the portion 36 of the support and the second end 2 of the tubular part a gap "a" is formed. The prism arrangement 34 is axially movable relative to the tubular part 1 within a specified adjustment range, so that the dimension of the gap "a" depends on the displacement of the prism arrangement relative to the tubular part. The prism arrangement is also rotatable relative to the sleeve, at least to a limited extent. By shifting and rotating the prism arrangement 34 and the tube 1 relative to each other during assembly, it is possible to adjust the point where the reflected radiation beam 31 impinges on the radiation-sensitive means 32. Once the position has been found in which the reflected secondary radiation beam 31 impinges within a specific tolerance zone on the radiation-sensitive means 32 of the output device 33 via the lateral opening 4, the prism arrangement is fixed relative to the tubular part. During adjustment a measuring device in a special measuring arrangement can be connected to the radiation-sensitive means 32, to provide a direct reading of the electric signal produced by a secondary radiation beam.

At the free end which faces the diode laser 5 the support 35 of the prism arrangement 34 is bevelled at an angle of 45° relative to the beam axis 14. The bevelled portion 37 thus obtained is formed with a slot 38 which is parallel to a plane which is defined by the beam axis 14 and a normal to the bevelled portion which intersects the beam axis. On each side of the slot 38 a bevelled surface 37A and 37B respectively is disposed. The first prism 29A of the double prism extends across the slot 38 and is attached to the bevelled surfaces 37A and 37B. The second prism 29B engages in the slot 38 and is attached to the first prism 29A. For its fixation the first prism 29A is provided with an ultraviolet-curing transparent cement over the entire width of the splitting surface 30A. Said layer is not shown in the Figure. The layer of cement connects the first prism 29A to the two bevelled surfaces 37A and 37B and moreover connects the respective faces 30A and 30B of the first prism 29A and the second prism 29B to each other.

The first prism 29A has a side face 39 through which the reflected secondary radiation beam 31 emerges from the double prism 29. On said side face a beam-splitting optical element 40 is arranged. Said element comprises two faces 41A and 41B which intersect each other in accordance with a straight line 42. Said line constitutes the refractive edge of the beam-splitting element and should be perfectly parallel to the optical axis 14 of the lens system. The entire optical element 40 is made of a cured transparent cement.

The support 9 of the laser device 6 is made of brass and has an annular portion 43. During manufacture of the laser device care has been taken to arrange the semiconductor laser 5 on the support in such a way that the beam axis 14 accurately coincides with the axis of the annular portion 43 of the support 9. Said annular portion is pressfitted into the prism arrangement to abut with an annular stop 44. This ensures accurate centring of the laser 5 relative to the prism arrangement. A critical dimension of the support 35 of the prism unit 34 is the distance between the annular stop 44 and point Q where the beam axis 14 intersects the plane of the bevelled portion 37. This is the only very accurate dimension of the support 35, which is subject to a tolerance of 30 microns. The diameter of the cylindrical portion of the support to be slid into the tubular part 1 should be in conformity with a standard ISO h7 sliding fit. The support 35 is placed on the outer surface of the cylidrical portion of the support in a mounting jig to abut with stops which accurately define the position. The first prism 29A, as already stated, is provided with a layer of a transparent ultraviolet-curing cement at the side of the splitting surface 30A. It is placed onto the bevelled surfaces 37A and 37B and is subsequently loaded in accordance with the arrows P1, P2 and P3 with accurate locating cams. The arrow P3 is represented as a double arrow to indicate that the front face 39 at the location of the arrow P3 bears against a fixed reference cam. Spring-pressure is applied in accordance with the arrows P1 and P2. As a result of this, the first prism 29A is aligned on the surfaces 37A and 37B in precisely the correct position, whilst moreover an accurate alignment is obtained in accordance with the line 45 which interconnects the ends of the arrows P1 and P2. The second prism 29B is placed into the slot 38 underneath the first prism 29A and bears on two fixed stops of the adjusting tool in accordance with the double arrows P4 and P5, under the influence of a force exerted by a movable locating cam and acting in accordance with the arrow P6. As a result of this, the reflecting surface 30B of the second prism 29B is pressed onto the reflecting surface 30A of the prism 29A. Moreover, an alignment is obtained relative to the axis 46 which interconnects the ends of the arrows P4 and P5. The first prism 29A is attached to the bevelled portion 37 of the support 35 and the second prism 29B is simultaneously attached to the first prism by exposing the two prisms to ultraviolet light in the position just described.

For the formation of the beam-splitting element 40 a drop of a transparent cement which cures under the influence of ultraviolet light is applied to the side face 39 of the first prism 29A. A glass die 47 of the adjusting tool, see FIG. 5, is positioned with the required high accuracy and the drop of transparent cement is allowed to cure by exposure to ultraviolet radiation via the glass die. After mounting two spacers 47 and 48 near the laser unit 6 the prism arrangement is ready for mounting in the tubular part 1.

A plastics holder 49 for the output device 33 is injection-moulded around the tubular part 1. Opposite the lateral opening 4 the tubular part 1 has a gate through which an amount of material of the holder 49 can enter the tubular part. Said material is moulded to form a locating cam 50, which engages the slot 38 of the prism unit with clearance for coarse adjustment of the prism arrangement in the direction of rotation.

After manufacture of the prism arrangement it is inserted into the tubular part in such a way that the cam 50 engages the slot 38. The output device 33 is connected to the electrical measuring equipment and the prism arrangement 34, in a measuring array, is manually adjusted within the adjustment range in the axial direction and the direction of rotation until the reflected secondary radiation beam impinges on the radiation-sensitive means 32 in the correct manner. Subsequently, at the location of a constricted portion 51 at the second end 2 of the tubular part, the tubular part 1 is connected to the support 34 for laser-welding, so that it is fixed within the adjustment range in a position in which the reflected radiation beam 31 impinges on the radiation-sensitive means within a specified tolerance zone via the lateral opening 4.

What is claimed is:

1. An optical scanning unit for scanning recording tracks of a reflecting optical record carrier (21), which unit comprises:
    a tubular part (1) having a first end (2) and a second end (3) and formed with a lateral opening (4),
    a radiation source (5) arranged near the first end (2) of the tubular part for emitting an unmodulated primary radiation beam (13) towards the second end (3) along a beam axis (14),
    a lens system (15, 16, 17) having an optical axis (14) and arranged near the second end (3) of the tubular part for concentrating the radiation beam (13) so as to form a radiation spot (19),
    a double prism (29) comprising first and second prisms (29A, B) attached to each other, which double prism has a splitting surface (30) disposed at an angle of 45° to the beam axis, for deflecting a secondary radiation beam (31), reflected by the record carrier (21) and modulated by the recording tracks, in a lateral direction through the lateral opening in the tubular part,
    an electronic output device (33) arranged externally of the tubular part, said device including radiation-sensitive means (32), disposed in the path of the secondary radiation beam (31), for converting the modulated radiation into an electrical signal, and
    a prism support arrangement (34) mounted in the first end (2) of the tubular part (1), which prism support arrangement comprises a metal support member (35) on which said double prism (29) and the radiation source (5) are mounted so as to be in radial and axial alignment relative to each other,
    said support member having one end adjacent said lateral opening which is bevelled at an angle of 45° relative to the beam axis (14) of the radiation source,
    said bevelled portion (17) having a slot (38) formed therein which is parallel to a plane defined by the beam axis (14) and a normal to the bevelled portion which intersects the beam axis, so that on each side of the slot a bevelled surface (37A, B) is formed, and wherein the first prism (29A) of the double prism extends across the slot (38) and is attached to the bevelled surfaces (37A, B), and
    the second prism (29B) engages in the slot (38) and is attached to the first prism (29A).

2. An optical scanning unit as claimed in claim 1, characterized in that the tubular part is internally provided with a locating cam (50) which engages said slot (38) of the prism arrangement (34) with clearance, in order to obtain a coarse adjustment relative to the tubular part in the direction of rotation of the prism arrangement.

3. An optical scanning unit as claimed in claim 1, characterized in that the first prism (29A) is attached both to the two bevelled surfaces (37A, B) of the support (34) and to the second prism (29B) by means of a layer of a transparent cement which is applied over the entire width of the first prism.

4. An optical scanning unit as claimed in claim 1, in which the double prism (29) carries a beam-splitting optical element (40) at that side face (39) where the reflected secondary radiation beam (31) emerges from the double prism, for splitting the secondary radiation beam into two sub-beams, characterized in that the said optical element entirely consists of a cured transparent cement.

5. An optical scanning unit as claimed in claim 1, wherein the prism support arrangement (34) is axially movable relative to the tubular part (1) and is also rotatable within an adjustment range, and the prism support arrangement (34) is fixed relative to the tubular part (1) within said adjustment range in a position in which the reflected secondary radiation beam (31) impinges, via the lateral opening (4) in the tubular part, on the radiation-sensitive means (32) of the output device (33) within a predetermined tolerance zone.

6. An optical scanning unit for scanning recording tracks of a reflecting optical record carrier, said unit comprising:
    a tubular member having a first and a second end and a lateral opening formed therein,
    a radiation source arranged near said first end for emitting an unmodulated primary radiation beam towards said second end along a beam axis,
    a lens system having an optical axis and arranged near said second end for concentrating said radiation beam into a radiation spot so that when the tracks are scanned by said spot, the radiation is modulated by the recording tracks and the modulated radiation is reflected back through said lens system and along said optical axis,
    a double prism arranged in said tubular member adjacent said lateral opening, said double prism having a first and second prism attached to each other and a splitting surface disposed at an angle of 45° to said optical axis for deflecting the reflected radiation in a lateral direction through said lateral opening in said tubular member, a radiation-sensitive means arranged externally of said tubular member in the path of the reflected radiation for converting the modulated, reflected radiation into a corresponding electrical signal, and means for supporting said double prism and said radiation source in said tubular member, said supporting means including a support member on which said double prism and said radiation source are mounted so that said beam axis is aligned with said optical axis and said source is spaced axially by a predetermined distance from a point on said splitting surface at which said beam axis intersects said splitting surface, said support member being rotatable and axially movable relative to said tubular member so as to enable the position of said splitting surface to be adjusted during assembly such that said reflected radiation is converged by said lens system into a desired spot on said radiation-sensitive means, whereupon said support member is fixed relative to said tubular member at the position at which said reflected radiation is converged into said desired spot.

7. The scanning unit as claimed in claim 6, wherein said source is a semiconductor diode laser and at least a portion of said support member on which said diode laser is mounted is made of metal and functions as a heat sink for said diode laser.

8. The scanning unit as claimed in claim 6 or 7, wherein said predetermined distance is substantially equal to the distance between said point on said beam splitting surface and said radiation-sensitive means on which said reflected beam is incident.

9. The scanning unit as claimed in claim 6, wherein said support member has a cylindrical portion configured to be in sliding engagement with a portion of said tubular member adjacent said second end thereof.

10. The scanning unit as claimed in claim 6, including a beam splitting element secured to a side face of said double prism at a position where said reflected beam emerges from said double prism, said optical element being arranged to split the reflected radiation beam into two sub-beams.

11. The optical scanning unit as claimed in claim 10, wherein said optical element consists of a cured transparent cement.

* * * * *